(12) United States Patent
Keller

(10) Patent No.: US 8,388,457 B2
(45) Date of Patent: Mar. 5, 2013

(54) BIASED PLUNGE PIN ASSEMBLY

(75) Inventor: Dustin D. Keller, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 142 days.

(21) Appl. No.: 12/881,349

(22) Filed: Sep. 14, 2010

(65) Prior Publication Data

US 2012/0063842 A1 Mar. 15, 2012

(51) Int. Cl.
*F16D 1/06* (2006.01)
*F16D 3/223* (2011.01)

(52) U.S. Cl. .......................... 464/146; 464/901; 464/906

(58) Field of Classification Search .......... 464/139–146, 464/901, 904–906; 403/315, 325–328
See application file for complete search history.

(56) References Cited

U.S. PATENT DOCUMENTS 2,474,360 A * 6/1949 Jimerson ...................... 403/328
6,145,416 A * 11/2000 Bonniot
6,874,392 B1 * 4/2005 Wu

FOREIGN PATENT DOCUMENTS

WO   WO 9002634   *   3/1990

OTHER PUBLICATIONS

"Crash Course on Retaining Rings." American Ring and Tool. Apr. 5, 2009, [online], [retrieved on Jun. 21, 2012] Retrieved from the Internet <URL: http://web.archive.org/web/20090504040612/http://www.americanring.net/rings_retaining_overview.aspx>.*
"Wave Springs—Advantages." Rotor Clip Company. May 13, 2009, [online], [retrieved on Jun. 21, 2012] Retrieved from the Internet <URL: http://web.archive.org/web/20090513143459/http://www.rotorclip.com/wave_spring_advantage1.php>.*

* cited by examiner

*Primary Examiner* — Gregory Binda
*Assistant Examiner* — Josh Skroupa
(74) *Attorney, Agent, or Firm* — Lowe Graham Jones PLLC

(57) ABSTRACT

A vehicle, such as off road vehicle, includes a plunge pin assembly located in a flexible joint, which maybe actuated without tools to decouple and thus remove a driven system from a driving system. The plunge pin assembly includes a plunge pin biased to an installed position such that a clip of the plunge pin assembly retains the driven system to the driving system during operation of a vehicle. The clip (e.g., circlip, snap ring, coil spring or crest wave spring) is circumferentially contractable and expandable. A transfer element cooperates with tapered and recessed contours of the plunge pin to permit the aforementioned actuation of the clip. Movement of the transfer pin along with contraction of the clip allows the driven system to be decoupled from the driving system. The plunge pin may include a head portion positioned at a desired distance from a drive axle of the driven system.

15 Claims, 5 Drawing Sheets

BIASED PLUNGE PIN ASSEMBLY

FIELD OF THE INVENTION

This invention relates generally to a biased plunge pin assembly operable by hand (e.g., without tools) to permit removal and replacement of a driven system from a driving system of a vehicle.

BACKGROUND OF THE INVENTION

All-terrain vehicles (ATVs) are meant to travel over rough terrain, in various conditions and at a variety of speeds. For handling and maneuverability purposes, ATVs are constructed to minimize weight. However, such construction can make various parts of the ATV more vulnerable to damage. One such part, for example, are the drive axles connecting the drivetrain to the wheels through a constant velocity, universal, or other type of flexible joint capable of transferring power between concentric or non-concentrically aligned shafts. More specifically, drive axles allow a rotating shaft to transmit power through a variable angle, at constant rotational speed, without an appreciable increase in friction or play.

Drive axles are typically installed with a spring clip that must either be removed or that must be "bumped" out of engagement with the driving system to which it is installed. In the case of such retaining means, removal and replacement of a drive axle requires one or more specialized tools and may be difficult to execute.

SUMMARY OF THE INVENTION

In at least one embodiment of the present invention, a plunge pin assembly is located in a flexible joint and may be actuated without tools to decouple and thus remove a driven system from a driving system. The plunge pin assembly includes a plunge pin normally biased to an installed position such that a clip of the plunge pin assembly retains the driven system to the driving system during operation of a vehicle. The clip, however, is circumferentially contractable and expandable and may take the form of a circlip or a snap ring. A transfer pin cooperates with tapered and recessed contours of the plunge pin to permit the aforementioned actuation of the clip, which in turn allows the driven system to be coupled or decoupled from the driving system without tools. In another embodiment, the plunge pin may include a head portion positioned at a desired distance from a drive axle of the driven system. Accordingly, applying an axial force onto the head portion of the plunge pin with the drive axle compresses a biasing member, axially moves the plunge pin, permits radial movement of the transfer pin into the recessed contour, and finally permits contraction of the clip that was previously engaged with the driving system.

In one aspect of the invention, a flexible joint engagable with a vehicle drive system component includes a housing having a first end with a flexible engagement assembly for engaging a driven shaft and a second end opposite the first end; a coupler shaft at the second end of the housing, the coupler shaft configured for engagement with the vehicle drive system component; a detent extending to an outer periphery of the coupler shaft and configured to engage the vehicle drive system component; a plunge pin disposed at least partially within the coupler shaft and movable relative thereto, the plunge pin biased toward the first end of the housing, the plunge pin having: a first portion contactable with the detent to maintain the detent in an engaged position with the vehicle drive system component; and a second portion adjacent the first portion, the second portion being recessed away from the outer periphery of the coupler shaft relative to the first portion; wherein movement of the plunge pin away from the first end of the housing aligns the second portion of the plunge pin with the detent to permit disengagement of the detent with the vehicle drive system.

In another aspect of the invention, an assembly for detachably coupling a driven system to a driving system includes a drive axle assembly; a flexible joint engagable with the driving system; a transfer pin arranged in the flexible joint to move relative to an axis of the drive axle assembly; a plunge pin located within the flexible joint, the plunge pin having a body extending between a transfer pin actuating portion and a head portion, the actuating portion having a recessed region configured to permit movement of the transfer pin; and a biasing member arranged in the flexible joint to bias the plunge pin toward a position where the driven system is retainably coupled with the driving system.

In yet another aspect of the invention, a vehicle having a driven system coupled to a driving system includes a halfshaft assembly coupled to the driving system, the halfshaft assembly having a drive axle and a flexible joint configured to transmit power from the driving system; and a plunge pin assembly coupled to the flexible joint, the plunge pin assembly having a detent mechanism, a plunge pin and a biasing member, the detent mechanism arranged in the flexible joint to move relative to an axis of the drive axle, the plunge pin having a body extending between an actuating portion and a head portion of the pin, the actuating portion having a tapered periphery configured to induce movement of the detent mechanism, and the biasing member arranged in the flexible joint to bias the plunge pin in a first direction in which the actuating portion urges the detent mechanism into engagement with driving system.

In still yet another aspect of the invention, a method for decoupling a driven system from a driving system includes the steps of (1) applying an axial force to a plunge pin assembly in a direction toward the driving system, the applied axial force sufficient to compress a biasing member and move the plunge pin; and (2) moving a detent mechanism toward an axis of the plunge pin, wherein moving the detent mechanism corresponds with movement of the plunge pin to disengage the driven system from the driving system.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present invention includes a biased detent assembly that may be operated by hand (e.g., without tools), to permit removal and replacement of a coupler axle unit from a vehicle, such as, but not limited to an all-terrain vehicle. The coupler axle unit may include a shaft coupled to flexible joints and configured to transfer power through a variable shaft angle, at a constant input-to-output rotational speed ratio, without an appreciable increase in friction or play. Generally, the coupler axle unit operates in sync with the suspension system, the front, the rear or both.

The flexible joints may take the form of a constant velocity (CV) joint arranged in a driveline. The CV joint is characterized by having an output speed equal to its input speed at any joint angle. The CV joint may take the form of Undercut free joint, Rzeppa joint, Bell joint, Cross Groove joint, Weiss joint, Tripod joint or Double Offset joint. A non-CV joint is commonly referred to as a universal joint, a Cardan joint, or Double Cardan joint. The CV joint includes an outer race, an inner race, a cage and balls.

Figure 1:
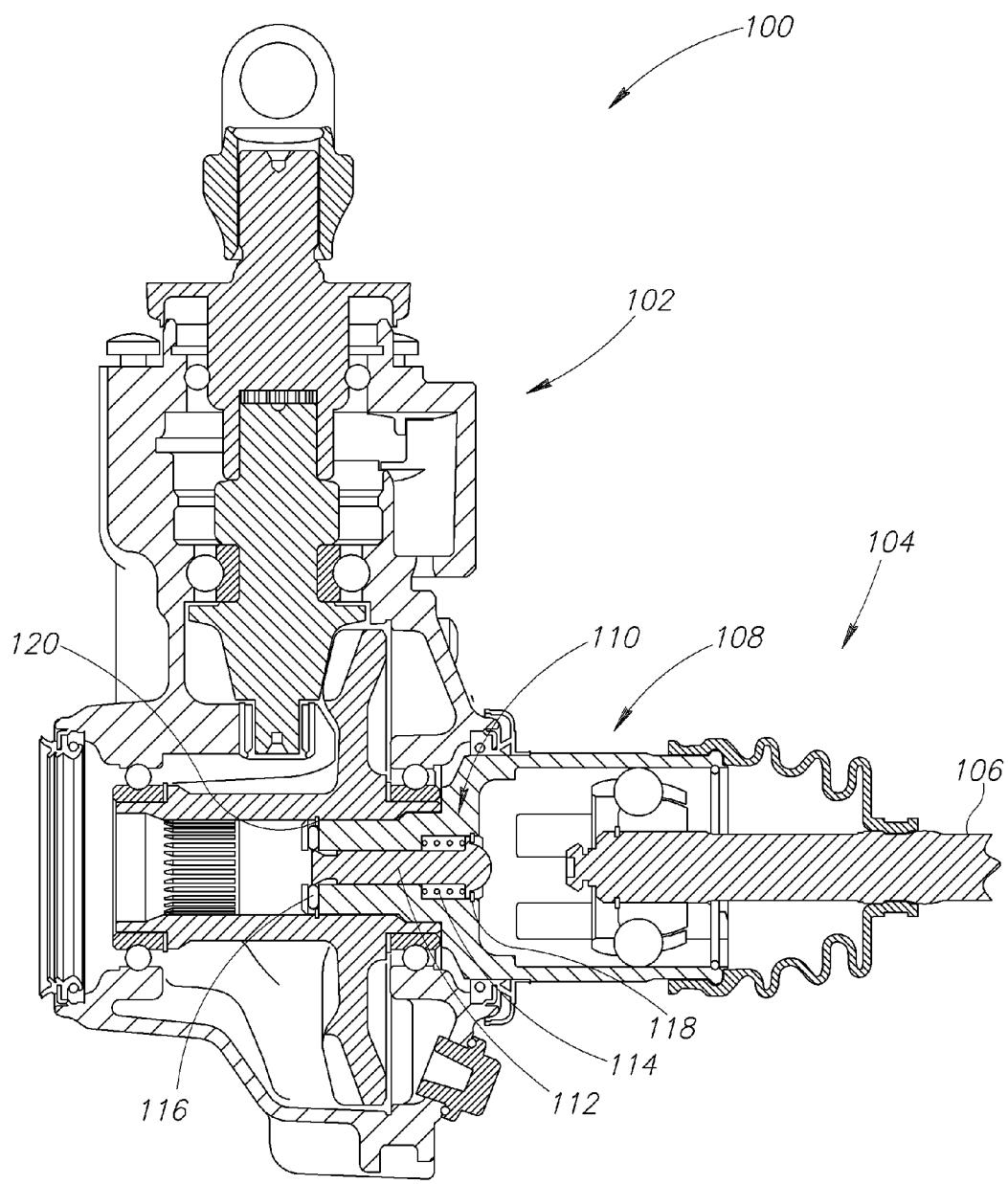
FIG. 1 is a cross-sectional view of a driven system coupled to a driving system with a plunge pin assembly according to an embodiment of the present invention.

FIG. 1 shows a powertrain system 100 with a driving system 102 coupled to a driven system 104. By way of example, the driving system 102 may take the form of a rear final drive while the driven system 104 may take the form of a halfshaft assembly with an articulating axle shaft 106 extending from a CV joint 108. Thus in the illustrated embodiment, the articulated shaft 106 delivers power from the rear drive 102 to the wheels (not shown) through the CV joint 108 to allow for movement of the axle shaft 106 relative to rear drive 102 during suspension movement.

For various reasons such as, but not limited to, maintenance, inspection, or damage, it may be necessary to remove and replace one or more components of the driven system 104. Accordingly, the driven system 104 includes a plunge pin assembly 110, which includes a plunge pin 112, a biasing member 114, a transfer pin 116, a first retaining device 118, and a second retaining device 120.

Figure 2:
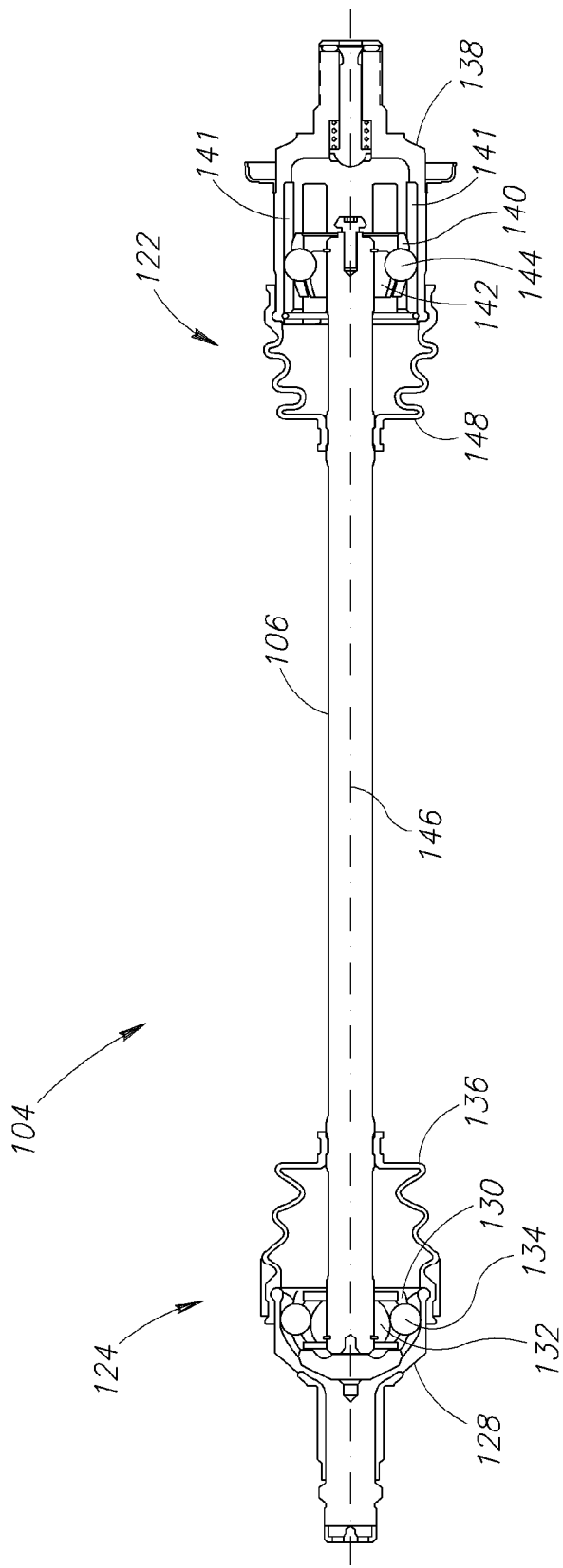
FIG. 2 is a side-elevational view of a halfshaft assembly with inboard and outboard flexible joints connected by an axle shaft and a plunge pin assembly located in the inboard flexible joint.

FIG. 2 shows the driven system 104 in the form of a drive axle system having an inboard flexible joint assembly 122 coupled to an outboard flexible joint assembly 124 through the axle shaft 106. In the illustrated embodiment, the inboard flexible joint assembly 122 takes the form of a double offset joint, which will be described in more detail below, while the outboard flexible joint assembly 124 takes the form of a Rzeppa or bell joint.

By way of example, the Rzeppa joint 124 includes four main components: a housing 128, a cage 130, a race 132 and the ball bearings 134. The housing 128 is generally constructed with six ball tracks (not shown) inside of a "bell" portion of the housing. The ball tracks allow for the ball bearings 134 to traverse with minimal friction and minimal heat generation. The ball bearings 134 are held between the race 132, the cage 130, and the housing 128. There are generally six windows (not shown) in the cage 130 that are aligned with the six ball tracks of the housing 128. The race 132 holds the ball bearings 134 in place by aligning its "legs" with the web between the windows in the cage 130. The Rzeppa joint is extremely flexible and can accommodate large angular changes, for example when the front wheels of a vehicle are turned by a steering system. The typical Rzeppa joints allow 45-48 degrees of articulation, while some can allow 52 degrees. An outboard boot 136 may be coupled to the shaft 106 and the housing 128 to protect the other components of the outboard joint 124 from debris, dirt, and other contaminants.

Similar to the outboard flexible joint assembly 124, the inboard flexible joint assembly 122 includes a housing 138, a cage 140, a race 142, and the ball bearings 144. However, it is important to note that the inboard flexible joint 122 is a plunge type joint meaning the shaft 106 is coupled to the housing 138 in a manner that allows for limited moving or "plunging" of the shaft 106 along the housing axis 146 relative to the housing 138. The ball bearings 144, in turn, are guided along grooves 141 formed in the housing 138. As shaft 106 is plunged further within housing 138, bearings 144 slide along grooves 141. These same grooves allow shaft 106 to move in an axial direction during suspension movement relative to the drive and housing 138 during normal use of the ATV. An inboard boot 148 may be coupled to the shaft 106 and the housing 138 to protect the other components of the inboard joint 122 from debris, dirt and other contaminants.

Figure 3:
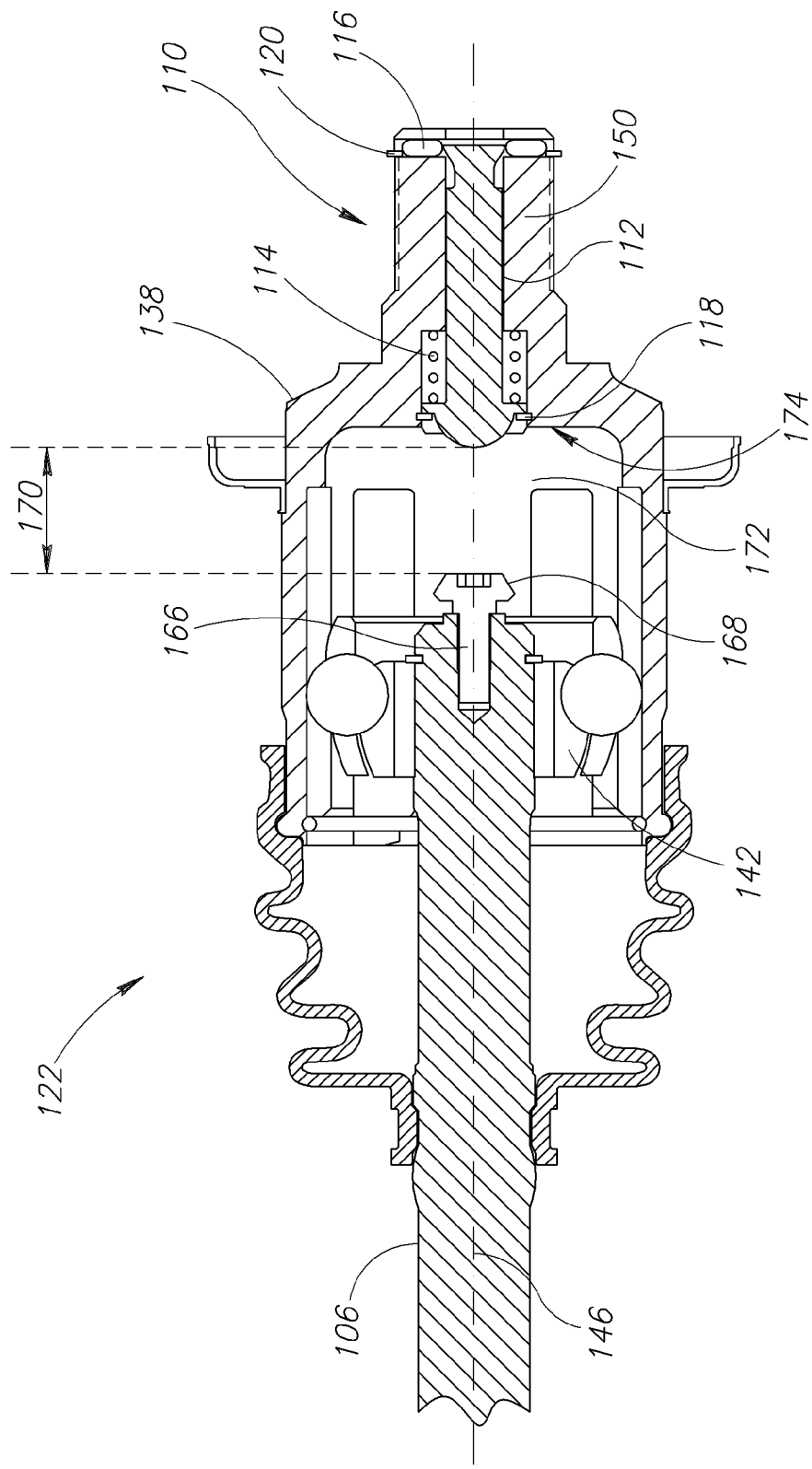
FIG. 3 is a partial side-elevational view of the halfshaft assembly of FIG. 2 showing the plunge pin assembly biased in an installed position.

FIG. 3 shows the inboard flexible joint assembly 122 having the plunge pin assembly 110. For purposes of brevity, the parts of the inboard flexible joint assembly 122 described above will be provided with the same reference numerals, but are not described in further detail unless they specifically interact or cooperate with the plunge pin assembly 110.

A coupling shaft 150 may extend from or be integrally formed with the housing 138. The coupling shaft 150 includes outer splines that engage a spool in the drive 102 (see also FIG. 1). The coupling shaft 150, in turn, receives the plunge pin 112, the biasing member 114, the transfer pin 116, the first retaining device 118 and the second retaining device 120. In one embodiment, the biasing member 114 may take the form of a wave spring; the first retaining device 118 may take the form of a retaining ring; and the second retaining device 120 may take the form of a circlip, a snap ring, a coil spring or a crest wave spring. By way of example, the circlip, snap ring, coil spring or crest wave spring includes a semi-flexible metal ring with open ends which can be snapped into place into a groove formed in the housing 138 for clip 118 and in the coupling shaft 150 for clip 120. The clip 120 prevents lateral (i.e., axial) movement of shaft 150 in the drive system and biases the transfer pins inward toward the axis of plunge pin 112. Using a coil spring for the second retaining device 120 may be advantageous because the coil spring ends overlap, which eliminates any gap for the transfer pins to escape.

Figure 4:
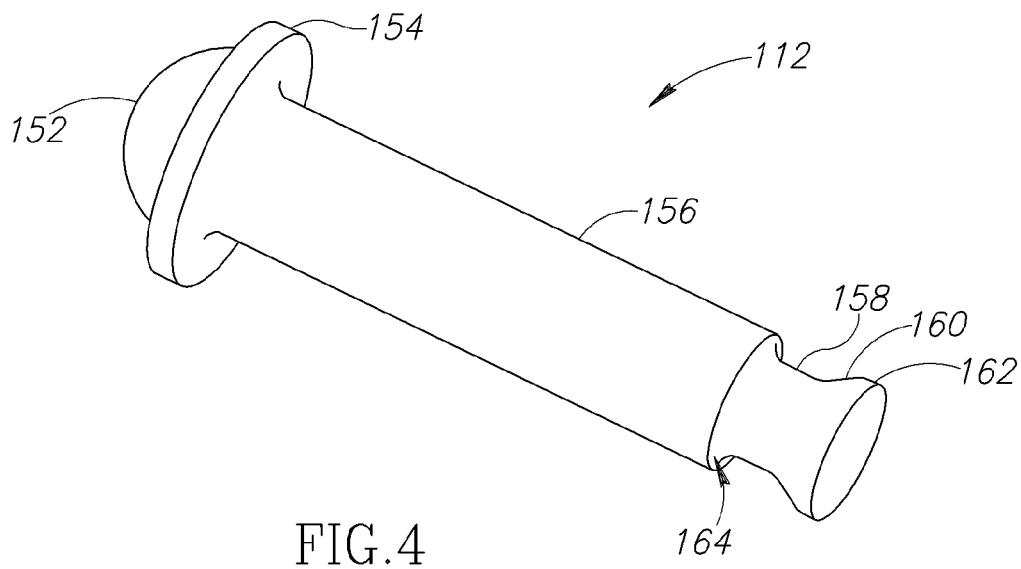
FIG. 4 is an isometric view of a plunge pin used in the plunge pin assembly of FIG. 2 according to an embodiment of the present invention.

FIG. 4 shows the plunge pin 112 having a contact head portion 152, a flange 154, a body 156, a necked down portion 158, a tapered portion 160, and a retaining portion 162. The necked down portion 158 includes an outer diameter that is less than the outer diameter of the retaining portion 162. The outer diameter of the tapered portion 160, in turn, slopes in an increasing manner from the necked down portion 158 to the retaining portion 162. The body 156 preferably includes a shoulder region 164 adjacent the necked down region 158. In one embodiment, the contact head portion 152 may have a semi-spherical surface. In one embodiment, the flange 154 includes an outer diameter that is larger than or at least equal to an outer operating envelope of the biasing member 114 (FIG. 3). The purposes of these plunge pin features are described hereinafter with respect to a method for removing the inboard flexible joint assembly 122 without tools.

Referring back to FIG. 3 while continuing to reference FIG. 4 for the plunge pin 112 features, the plunge pin 112 may be concentrically aligned with the axis 146 of the shaft 106. A fastener 166 is also aligned with the axis 146 of the shaft 106.

A head 168 of the fastener 166 and the contact head portion 152 of the plunge pin 112 are arranged a desired distance 170 apart.

When the inboard flexible joint 122 is adequately installed (hereinafter referred to as an installed configuration), the head 168 of the fastener 166 and the contact head portion 152 of the plunge pin 112 are separated as noted above, and thus not in contact, even during the full range of suspension movement. In turn, the biasing member 114 is expanded such that the flange 154 is urged toward an inner cavity 172 of the housing 138 and the first retaining device 118 cooperates with the housing 138 to allow the contact head portion 152 of the plunge pin 112 to extend only a desired distance beyond an inner wall 174 of the housing 138. The expansion of the biasing member 114 further forces an inner diameter portion of the transfer pin 116 to ride along and move radially outward due to the tapered portion 160 of the plunge pin 112. In other words, the tapered portion 160 allows an outer diameter portion of the transfer pin 116 to radially move the second retaining device 120 (e.g., circlip, snap ring, coil spring or crest wave spring) into a retaining engagement with the driving system 102, which in turn axially retains or secures the driven system 104 with respect to the driving system 102.

Depending on the type of joint and the amount of retention desired, various aspects of the plunge pin assembly 110 may be adjusted or modified, for example the biasing forces of the biasing member 114 and the second retaining device 120, the radial length of the transfer pin 116, the necked down portion 158 of the plunge pin 112, or the outer diameter of the retaining portion 162 of the plunge pin 112. The amount of retention desired is generally the amount needed to secure the driven system 104 to the driving system 102 during vehicle operation while maintaining the spring force in the biasing member 114 at a level where the biasing member 114 may be compressed when plunging the shaft 106 by hand. Note that there are not normally large axially directed forces acting on the housing 138 and the coupling shaft 150 since ball bearings 144 are free to move along the grooves 141 in the housing 138 to allow for axial movement of shaft 106 along the housing axis during suspension travel.

Figure 5:
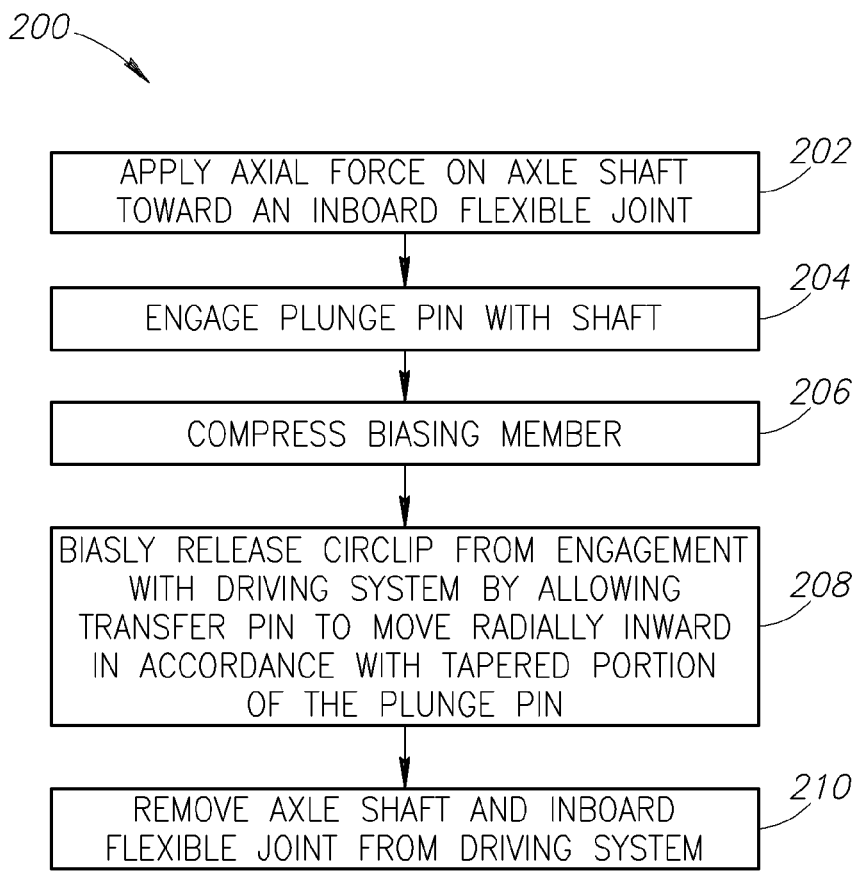
FIG. 5 is a flowchart for a method of decoupling a driven system from a driving system using a plunge pin assembly.

In addition to achieving the desired amount of retention when in the installed configuration, the plunge pin assembly 110 may advantageously allow for the removal of the inboard flexible joint 122 from the drive system 102 without using any tools. FIG. 5 shows such a tool-free method 200. At step 202, with vehicle suspension arms removed (not shown) an axial force is applied on the shaft 106 toward the inboard flexible joint 122 in a manner that moves the shaft 106 or fastener 166 (e.g., button) into contact with the plunge pin 112 (refer to FIGS. 1 and 3). As discussed earlier, the inboard flexible joint 122 is configured to permit the shaft 106 to be plunged inward due to the configuration of the balls, races, cage, and housing. At step 204, the shaft 106 operatively contacts the plunge pin 112. In the present context, operatively contacts means the shaft 106 may not necessarily come into direct contact with the plunge pin 112, but movement of the shaft 106 causes at least an attached component (e.g., the fastener 166 or button) to make direct contact with the plunge pin 112.

At step 206 and in view of the force now applied to the plunge pin 112, the biasing member 114 is compressed by a desired amount. At step 208, the compression of the biasing member 114 causes the second retaining device 120 to be released from engagement with the driving system 102 since the transfer pins 116, which are axially fixed, are now permitted to move radially inward corresponding to the tapered portion 160 of the plunge pin 112. In short, axial movement of the shaft 106 results in axial movement of the plunge pin 112, which in turn results in radial movement of the transfer pins 116 and circlip 120. At step 210, the shaft 106 and the inboard flexible joint 122 (i.e., the driven system 104) may be physically separated from the driving system 102.

Figure 6:
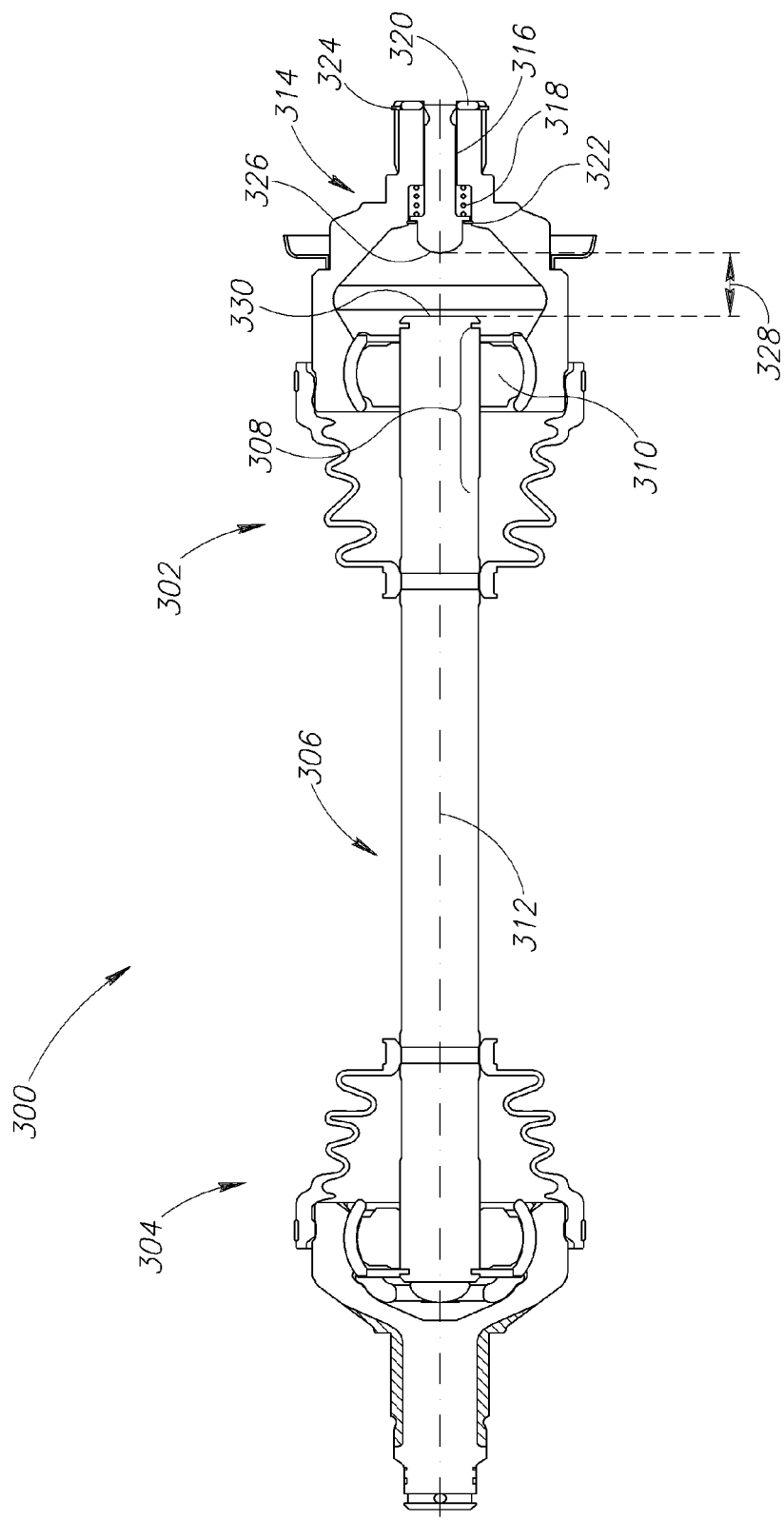
FIG. 6 is a side-elevational view of a halfshaft assembly with inboard and outboard flexible joints connected by an axle shaft and a plunge pin assembly according to another embodiment of the present invention.

FIG. 6 shows another driven system 300 in the form of a drive axle system having an inboard flexible joint assembly 302 coupled to an outboard flexible joint assembly 304 through the axle shaft 306. The driven system 300 is similar to the driven system 104 described above and includes some similar or identical components. For the purposes of brevity, such similar or identical components will not necessarily be described in detail herein and may not be provided reference numerals.

In the illustrated embodiment, both the inboard and outboard flexible joint assemblies 302, 304 take the form of universal joints. The shaft 306 includes a splined portion 308 coupled to a inner race 310 and movable along a shaft axis 312 relative to the inner race 310. A plunge pin assembly 314 includes a plunge pin 316, a biasing member 318, a transfer pin 320, a first retaining device 322 and a second retaining device 324.

A plunge pin 316 includes an extended head portion 326 sized for controlling a distance 328 between the plunge pin 316 and a shaft end surface 330. In the illustrated embodiment, the head portion 326 is an oval or elliptical shape, but other shapes may be utilized. The operation of the plunge pin assembly 314 is substantially the same as described above with regard to FIG. 5 except that the end surface 330 of the shaft 306, instead of a fastener, makes direct contact with the plunge pin 316.

The plunge pin 316 is fit within the coupler shaft with close tolerances or seals to prevent oil leaking into the CV joint housing when the end of the coupler shaft is open to the internal space of the final drive as in the case of the front differential in the preferred embodiment.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A flexible joint engagable with a vehicle drive system component, the flexible joint comprising:
  a housing having a first end with a flexible engagement assembly for engaging a driven shaft and a second end opposite the first end;
  a coupler shaft at the second end of the housing, the coupler shaft configured for engagement with the vehicle drive system component;
  a detent extending to an outer periphery of the coupler shaft and configured to engage the vehicle drive system component;
  a plunge pin disposed at least partially within the coupler shaft and movable relative thereto, the plunge pin biased toward the first end of the housing and spaced apart from the coupler shaft, the plunge pin having:
    a first portion contactable with the detent to maintain the detent in an engaged position with the vehicle drive system component; and
    a second portion adjacent the first portion, the second portion being recessed away from the outer periphery of the coupler shaft relative to the first portion;
  wherein movement of the plunge pin away from the first end of the housing aligns the second portion of the plunge pin with the detent to permit disengagement of the detent with the vehicle drive system.

2. The flexible joint of claim 1, wherein the detent includes a transfer element.

3. The flexible joint of claim 1, wherein the detent includes a transfer pin and a retaining device positioned on a periphery of the transfer pin, the retaining device configured to engage the vehicle drive system component.

4. The flexible joint of claim 1, wherein the second portion of the plunge pin includes a tapered portion.

5. A flexible joint engagable with a vehicle drive system component, the flexible joint comprising:
    a housing having a first end with a flexible engagement assembly for engaging a driven shaft and a second end opposite the first end;
    a coupler shaft at the second end of the housing, the coupler shaft configured for engagement with the vehicle drive system component;
    a detent extending to an outer periphery of the coupler shaft and configured to engage the vehicle drive system component;
    a plunge pin disposed at least partially within the coupler shaft and movable relative thereto, the plunge pin biased toward the first end of the housing, the plunge pin having:
        a first portion contactable with the detent to maintain the detent in an engaged position with the vehicle drive system component and
        a second portion adjacent the first portion, the second portion being recessed away from the outer periphery of the coupler shaft relative to the first portion;
    wherein movement of the plunge pin away from the first end of the housing aligns the second portion of the plunge pin with the detent to permit disengagement of the detent with the vehicle drive system, wherein the flexible joint is positioned on a first end of the driven shaft proximate a wheel hub or on a second end of the driven shaft distally located from a wheel hub.

6. An assembly for detachably coupling a driven system to a driving system, the assembly comprising:
    a drive axle assembly;
    a flexible joint engagable with the driving system;
    a transfer pin arranged in the flexible joint to move relative to an axis of the drive axle assembly;
    a plunge pin located within the flexible joint, the plunge pin having a body extending between a transfer pin actuating portion and a head portion, the actuating portion having a recessed region configured to permit movement of the transfer pin;
    a retaining device circumferentially positioned radially outward of the transfer pin and in contact therewith, the retaining device configured to flexibly constrict or expand to engage or disengage with the driving system in accordance with the movement of the transfer pin; and
    a biasing member arranged in the flexible joint to bias the plunge pin toward a position where the driven system is retainably coupled with the driving system.

7. The assembly of claim 6, wherein the transfer pin moves in a radial direction relative to the axis of the drive axle assembly.

8. The assembly of claim 6, wherein the biasing member is a wave spring.

9. The assembly of claim 6, further comprising a flange coupled to the plunge pin for limiting movement of the plunge pin in an axial direction relative to an axis of the drive axle assembly.

10. The assembly of claim 6, further comprising an end portion of the plunge pin distally located from the head portion, the end portion having an outer perimeter that exceeds an outer perimeter portion of the recessed region of the plunge pin.

11. The assembly of claim 6, wherein the transfer pin includes a bearing surface in contact with the plunge pin.

12. The assembly of claim 6, wherein the transfer pin is oriented substantially orthogonal with respect to the plunge pin.

13. The assembly of claim 6, wherein the retaining device is a circlip.

14. A vehicle having a driven system coupled to a driving system, the vehicle comprising:
    a halfshaft assembly coupled to the driving system, the halfshaft assembly having a drive axle and a flexible joint configured to transmit power from the driving system; and
    a plunge pin assembly coupled to the flexible joint, the plunge pin assembly having a detent mechanism, a plunge pin and a biasing member,
        the detent mechanism arranged in the flexible joint to move relative to an axis of the drive axle,
        the plunge pin being spaced apart from the drive axle in a direction parallel with the drive axle to permit the drive axle to move axially relative to the plunge pin during normal operation, wherein the drive axle is configured to engage the plunge pin to move the plunge pin axially to release the plunge pin assembly,
        the plunge pin having a body extending between an actuating portion and a head portion of the pin, the actuating portion having a tapered periphery configured to induce movement of the detent mechanism, and
        the biasing member arranged in the flexible joint to bias the plunge pin in a first direction in which the actuating portion urges the detent mechanism into engagement with a driving system.

15. The vehicle of claim 14, wherein the halfshaft assembly transmits power from the driving system at substantially a constant velocity ratio.

* * * * *